April 1, 1941.   B. E. WILLIAMS ET AL   2,237,277
MEAT PRODUCT
Filed June 7, 1939

ATTEST -

Beverly E. Williams and
Leon L. Cadwell
INVENTOR
BY
ATTORNEY

Patented Apr. 1, 1941

2,237,277

UNITED STATES PATENT OFFICE 2,237,277

MEAT PRODUCT

Beverly E. Williams and Leon L. Cadwell, Chicago, Ill., assignors to Industrial Patents Corporation, Chicago, Ill., a corporation of Delaware Application June 7, 1939, Serial No. 277,937

2 Claims. (Cl. 99—174)

This invention relates to the preparation of packaged meat cuts.

Although large quantities of meat are sold in carcass form, such as whole carcasses of veal and lamb and sides or quarters of beef, fresh cuts constitute an appreciable percentage of the volume of fresh meat marketed.

Among the purposes of the present invention is the provision of an improved method for handling meat cuts, such as beef cuts and cuts of veal and lamb.

The drawing illustrates the application of the method of the present invention to a beef round.

Figure 1:
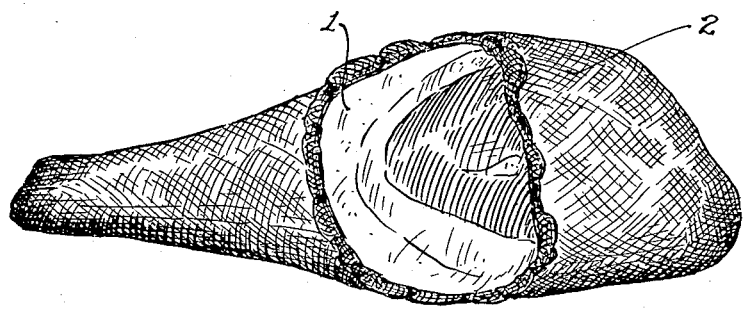
Figure 1 is a perspective view of a beef round partially clothed.

The present invention is applicable to conventional cuts of fresh beef, lamb or veal in the condition in which these cuts are severed from the remaining portion of the carcass. It will be appreciated, of course, that the invention may be applied with equal effectiveness to cuts of other edible animals.

The manner of practicing the invention will be readily understood by reference to the drawing.

Figure 2:
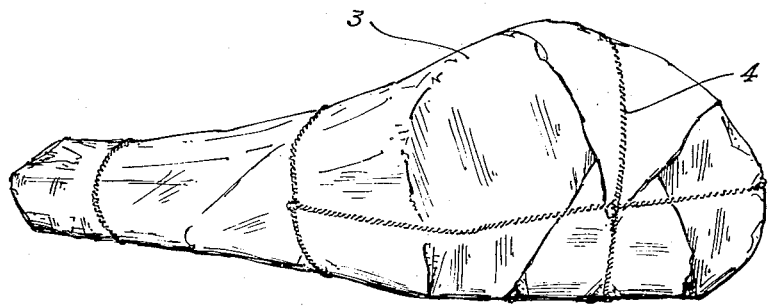
Figure 2 is a perspective view of a beef round which has been completely packaged.

As shown in Figure 1, beef cut 1 is covered with brine moistened cloth 2 and as shown in Figure 2, brine moistened cloth 2 is then covered with an outer covering 3 tied with an appropriate cord 4. In the case of meat which is not to be frozen the cut is covered with a cloth which has been soaked in a salt water solution and then wrung out to a condition of moistness. A satisfactory cloth may be prepared from beef sheeting or stockinette. If stockinette is used, it is preferable that it be of a tight weave. We have found that a sodium chloride solution of 20 degrees salometer reading strength gives effective results.

The brine moistened cloth serves to keep the surface of the meat cut in prime condition in combination with the outer covering. A preferred type outer covering is what is known to the trade as normal Cellophane, that is, transparent cellulosic paper 0.00088 inch in thickness which has not been waterproofed.

The small quantity of brine on the cloth affords protection to the meat by inhibiting bacterial growth. The cloth has a wicking action and withdraws a slight amount of moisture from the meat. The outer wrapping of transparent normal cellulosic paper completes a humidor package and allows the passage of sufficient air and vapor between the product and the outer atmosphere to keep the product in an excellent state of preservation and maintain the general good appearance of fresh cuts of meat.

We have found a modification of the method which has been described applicable to the treatment of meat cuts prepared for freezing. In preparing meat cuts for freezing in accordance with the present invention, the procedure which has been described is followed with the exception that the outer integument is waterproof to inhibit dehydration of the meat during freezer storage. It will be understood, of course, that although we prefer to use normal Cellophane for the unfrozen meat and waterproof Cellophane for the frozen cuts, equivalent material prepared from substances other than viscose, which is the base of Cellophane, may be used.

We claim:

1. The method of packaging fresh meat cuts which comprises covering the outer surface of the meat cut with a brine moistened cloth and covering the brine moistened cloth with transparent cellulosic paper whereby the brine moistened cloth is held in intimate contact with the meat surface.

2. The method of treating fresh meat cuts which comprises covering the outer surface of the meat cut with a brine moistened cloth and covering the brine moistened cloth with an outer wrapper of transparent cellulosic paper of a type which will permit the passage of vapor therethrough and whereby the brine moistened cloth is held in intimate contact with the meat surface.

BEVERLY E. WILLIAMS.
LEON L. CADWELL.